Figure 1:
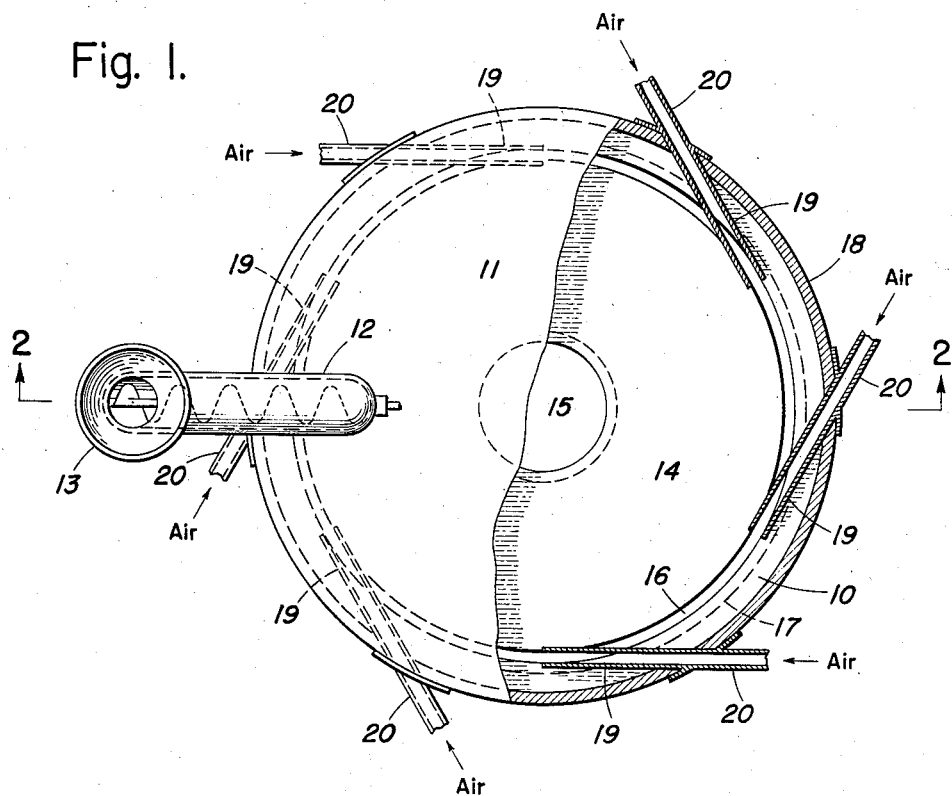

2,846,151
Patented Aug. 5, 1958

2,846,151

SELECTIVE DISINTEGRATION AND SEPARATION OF PIGMENTS

Julius Wehn, Leverkusen, Werner Busch, Leverkusen-Bayerwerk, Joachim Rockstroh, Leverkusen, and Walter Beushausen, Fritz Kaiser, and Hans Rumpf, Augsburg, Germany, assignors of one-third each to Farbenfabriken Bayer Aktiengesellschaft, Leverkusen-Bayerwerk, Germany, a corporation of Germany, National Lead Company, New York, N. Y., and Alpine Aktiengesellschaft, Augsburg, Germany, a corporation of Germany Application August 13, 1954, Serial No. 449,744

Claims priority, application Germany August 17, 1953

6 Claims. (Cl. 241—14)

This invention relates in general to an improved process for disintegrating materials and more especially to the disintegration of inorganic pigment materials by a dry milling process to produce a pigment of uniform particle size and good color.

In general, the disintegration of solid materials of natural origin, as for example minerals and rocks, or solid materials of artificial origin, such as pigment materials, pigment extenders and the like, is accompanied by serious difficulties when the materials are not homogeneous but consist of fractions of different degrees of hardness.

The disintegration of solid materials of artificial origin having fractions of different degrees of hardness is a problem of considerable magnitude especially in the field of pigment manufacture wherein it is necesary to calcine the raw pigment in order to form a pigment material having a preferred particle size, low oil absorption value, optimum tinting strength, good color and other desired physical characteristics. During calcination the raw pigment material is tumbled at high temperatures for a predetermined period of time, as a consequence of which substantial amounts of coarse agglomerates are formed, the accepted theoretical explanation for the formation of the agglomerates being that when calcining raw pigment materials, such as for example a hydrate of titanium on a large scale, it is practically impossible to avoid non-uniform heating, whereby localized fractions of the hydrate are overcalcined. Although the overcalcined agglomerates are substantially identical with the normally calcined pigment both chemically and crystallographically, yet, due to their greater hardness, they resist disintegration during subsequent milling treatments, and although attempts have been made to overcome the disadvantages occasioned by the presence of the overcalcined agglomerates in the pigment material by a more severe and/or extended milling treatment so as to reduce the size of this hard fraction, it has been found that this inevitably results in a deterioration of the color of the final pigment.

An object, therefore, of the present invention is to provide an improved method for treating a heterogeneous mixture of hard and soft fractions to form a product of uniform quality and particle size.

A further object of the invention is to provide an improved method for disintegrating materials containing both hard and soft fractions wherein the hard fraction is separated and removed substantially intact from the soft fraction, while the latter is being subjected to a mild milling treatment.

A still further object of the invention is to provide, in a series of milling operations for the treatment of a calcined pigment material, the selective separation and removal of the substantially intact hard agglomerates from the pigment material while simultaneously subjecting the normally calcined soft pigment to a mild disintegration treatment after which the agglomerate-free mildly disintegrated soft pigment is subjected to further milling.

Figure 2:
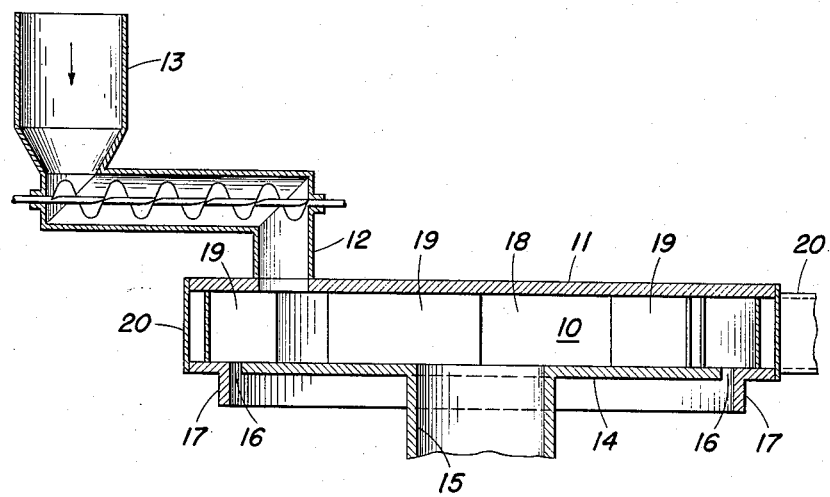

These and other objects, features and advantages of the invention will be described more fully in the following specification which is descriptive of one embodiment of the invention and in which:

Figure 1 is a schematic plan view, partly broken away, of apparatus for carrying out the process of the instant invention, and Figure 2 is a vertical section of the apparatus on line 2—2 of Figure 1.

In its broadest aspects, the present invention relates to a method for disintegrating materials containing hard and soft fractions characterized by selective separation and removal of the hard fractions in substantially intact form during simultaneous disintegration of the soft fractions, and in particular to the application of this method to a process for milling calcined pigment materials.

The terms "intact" and "substantially intact" as used herein with reference to the hard fractions and especially the overcalcined pigment agglomerates shall be understood to mean that these hard elements are not ground or disintegrated into smaller particle sizes, and it is in this sense that the milling treatment is referred to as a "mild" disintegration treatment.

There are in general two processes for producing finely divided calcined titanium dioxide pigments, one being a wet milling process, and the other a dry milling process. Although dry milling of calcined pigment may not produce as fine sub-division of the pigment as does wet milling, it has a cost advantage in that it does not require the expensive drying step which is required following wet milling. Moreover, it is the only practicable method of milling pigments which are soluble in water or which are not easily dispersed in water.

There are at least two recognized methods of dry milling, the more common method being a pulverizing process by which a coarse calcined pigment material is reduced to an impalpable powder by the use of ring roll mills, edge runner mills, pebble mills and the like. The second method of dry milling is known in the art as disintegration and is to be distinguished from a pulverizing process in that by the latter process, the pigment material is actually ground between to hard surfaces whereas in a disintegrating process, the breakdown of the pigment particles and agglomerates is accomplished by attrition by means of rotary hammer mills, squirrel cage disintegrators or by fluid energy mills in the manner characteristic of a micronizer or jet mill.

In accordance with the present invention, it has been found that a highly dispersed titanium dioxide pigment of substantially uniform texture, good color and free from agglomerates may be obtained by subjecting a pigment material, which has already been premilled by a pulverizing process, to a mild disintegrating treatment in a fluid energy type mill wherein the overcalcined and hence larger and harder pigment agglomerates are broken away from the softer normally calcined pigment material by attrition and, while still intact, are separated and removed from the mill during the mild disintegration treatment of the softer pigment material, the coarse hard overcalcined agglomerates being continuously removed from the mill during such treatment; and thereafter subjecting the agglomerate-free relatively soft partially disintegrated pigment to further milling treatment to produce a pigment of the desired particle size. Thus, in contradistinction to present methods for treating pigment materials by rotary hammer mills or fluid energy mills wherein the milling operation is relatively severe and/or prolonged over an extended period of time so as to effect substantially complete disintegration of the hard agglomerates in the presence of the normally calcined soft material, the process of this invention selectively separates and removes the hard agglomerates from the normally calcined soft material in a separate and preferably intermediate operation preparatory to the final disintegration or milling of the agglomerate-free normally calcined material, as a consequence of which the color of the normally calcined soft material is not impaired and the power requirements for disintegrating the normally calcined material is appreciably reduced.

As indicated above, the method of the instant invention is essentially a combined selective separation and mild disintegration treatment of heterogeneous mixtures of hard and soft fractions, and while it may be used independently of other milling operations, it is especially useful as an intermediate step in successive milling operations, and more particularly as an intermediate step of the normal two-step dry milling operations used extensively in the art for milling pigment materials. Thus, following an initial milling operation, which is usually a pulverizing operation effected by means of a ring roll mill or the equivalent, the milled pigment is subjected to the combined selective separation and mild disintegration treatment of this invention in a mill of the type shown in the drawings wherein the hard agglomerates are separated and removed from the normally calcined relatively soft material during mild disintegration of the latter as hereinafter described. Thereafter, the normally calcined relatively soft disintegrated pigment material is transferred to a third mill for further disintegration, and inasmuch as the soft normally calcined material is free of hard overcalcined agglomerates, the final disintegration step may be carried out without color deterioration of the pigment material.

The selective separation and disintegrating process of this invention may be carried out advantageously in the fluid energy mill of the type illustrated in the drawings wherein the mill comprises a cylindrically shaped grinding chamber 10, having a cover plate 11 provided with a vertical aperture adjacent its outer edge through which pigment material is introduced into the chamber 10 by way of a feed pipe 12 connected to a hopper 13, the latter being provided with a screw feed for transferring the pigment material from the hopper to the feed pipe 12. The bottom plate 14 of the cylindrically shaped grinding chamber is characterized by a substantially central exhaust port 15 and by a circumferential slot 16 substantially concentric to the central exhaust port 15 and located adjacent the outer edge of the bottom plate 14, the outer bottom edge of the circumferential slot 16 being provided with a circumferential depending lip 17.

Intersecting the peripheral wall 18 of the chamber substantially tangential to the circumferential slot 16 in the bottom plate 14 thereof are a plurality of inlet orifices 19 to which nozzles 20 are attached for introducing a gaseous fluid, such as, for example, air, tangentially into the chamber at high velocities, thereby to circulate the material therein and effect selective separation and disintegration thereof.

In carrying out the process of this invention by use of the above-described apparatus, gaseous fluid such as air is continuously introduced by way of the nozzles 20 into the chamber 10 at an entrance velocity of about 100 meters per second. The calcined titanium dioxide pigment material, which may have already been ground in a pulverizing mill, is delivered into the chamber 10 from the hopper 13 by way of the feed pipe 12. As it is introduced into the classifying grinding chamber 10, the pigment material is picked up by the stream of circulating air and circulated rapidly within the chamber, as a consequence of which the overcalcined and harder agglomerates are flung outwardly radially by centrifugal force, due to their relatively high specific gravity, towards the outer periphery of the chamber 10 where they fall through the circumferential slot 16 in the bottom thereof. In this manner the hard agglomerates are selectively separated and removed from the normally calcined soft pigment material. The latter, under the influence of the high velocity air, is itself partly disintegrated by attrition effected by the shearing action, which is characteristic of a fluid energy mill, so that the particle size of the normally calcined soft pigment material is substantially uniform and no larger than about 6 microns. This finely divided pigment material is ultimately carried to the vortex of the body of circulating air and hence to the center of the mill at which point it is discharged through the exhaust port 15 in the bottom thereof, the discharge of the finely ground material being facilitated by means of an attached ventilator (not shown). The finely divided pigment material may thereafter be separated from the gaseous carrier fluid by means of a conventional cyclone or tube filter and subjected to a further milling operation to reduce the particle size of the material to that required for use as a pigment in paints, enamels, varnishes and the like. Due to its more satisfactory particle size and the absence of hard agglomerates, the pigment material is of a lighter color than pigment materials milled by processes heretofore known and used, and when used in a paint or enamel, produces a coating of good color and surface characteristics.

Although the process of the instant invention is adapted especially for use as an intermediate milling step in a multistep milling operation, it will be appreciated that the invention may be practiced independently of ancillary milling operations and that its application is not limited to the separation and removal of hard agglomerates from calcined pigment material but is applicable to any material, either natural or artificial, comprising a heterogeneous mixture of hard and soft fractions wherein it may be desired to selectively separate the hard fractions from the soft fractions while simultaneously disintegrating the soft particles in a single operation.

We claim:
1. Method for disintegrating a heterogeneous mixture of solid fractions of varying degrees of hardness to form a finely divided product of uniform particle size and quality comprising the steps of: introducing said heterogeneous mixture into a circulating body of gaseous fluid, selectively separating and removing the relatively hard fractions of said mixture substantially intact from the circulating gaseous fluid and simultaneously disintegrating the soft fractions of the mixture.

2. Method for disintegrating a calcined pigment material comprising hard overcalcined agglomerates and normally calcined relatively soft pigment material to form a finely divided pigment material of uniform particle size and quality comprising the steps of: introducing said pigment material into a circulating body of gaseous fluid to centrifugalize said pigment material, selectively separating and removing the substantially intact overcalcined hard agglomerates from the circulating gaseous fluid and the normally calcined pigment material; and simultaneously subjecting the normally calcined relatively soft particles of pigment to mild disintegration.

3. Process for disintegrating a heterogeneous mixture of materials embodying hard and soft fractions to form a finely divided product of uniform particle size and quality comprising the steps of: premilling the heterogeneous mixture of material, disintegrating the premilled material by creating a circulating body of gaseous fluid within a chamber having an outlet, and introducing the premilled material into said circulating body of gaseous fluid to centrifugalize said mixture of materials and selectively separate the hard fractions substantially intact from the soft fractions, discharging said substantially intact hard fractions from said chamber through the outlet thereof while simultaneously mildly disintegrating the soft fraction, and thereafter subjecting the soft fraction to further disintegration.

4. A process for producing a finely divided pigment material of uniform particle size and quality from a calcined pigment material embodying overcalcined hard agglomerates and normally calcined relatively soft pigment material comprising the steps of: premilling the calcined pigment material, disintegrating the premilled pigment material by creating a circulating body of air within a chamber having an outlet, and introducing the premilled pigment material into said circulating body of air to centrifugalize said pigment material and selectively separate the hard agglomerates substantially intact from the normally calcined relatively soft pigment material, and discharging said substantially intact hard agglomerates from said chamber through the outlet thereof while simultaneously disintegrating the said soft normally calcined pigment material.

5. In a process for milling calcined pigment material containing overcalcined relatively hard agglomerates and normally calcined relatively soft pigment wherein said calcined pigment material is subjected to multimilling operations, the step of subjecting said calcined pigment material to a disintegrating milling operation following a first milling operation, said disintegrating milling operation comprising creating a circulating body of air within a chamber having an outlet, and introducing the pigment material from said first milling operation into said circulating body of air to centrifugalize said pigment material, and selectively separate the hard substantially intact agglomerates from the normally calcined relatively soft pigment material, discharging said substantially intact hard agglomerates from said chamber through the outlet thereof while simultaneously partially disintegrating the normally calcined soft pigment material, discharging the partially disintegrated normally calcined soft pigment material from said chamber, and thereafter subjecting said partially disintegrated normally calcined relatively soft pigment to further disintegration.

6. Apparatus for milling a heterogeneous mixture of solid fractions of varying degrees of hardness to form a finely divided product of uniform particle size and quality comprising: a substantially cylindrical chamber having a bottom plate, an inlet port, a discharge port at the center of said bottom plate, and an annular peripheral outlet, said annular peripheral outlet being in the said bottom plate of said chamber, and fluid energy supply means secured to said chamber tangentially to said annular peripheral outlet in said bottom plate for creating a circulating body of gaseous fluid within said chamber.

References Cited in the file of this patent

UNITED STATES PATENTS

| 1,771,477 | Alton | July 29, 1930 |
| 2,032,827 | Andrews | Mar. 3, 1936 |
| 2,628,786 | Piperoux et al. | Feb. 17, 1953 |

FOREIGN PATENTS

| 14,418 of 1913 | Great Britain | June 21, 1913 |